May 11, 1965
R. J. GOMES
3,182,631
DUAL SCALE SHAFT ANGLE INDICATOR
Filed Nov. 9, 1962
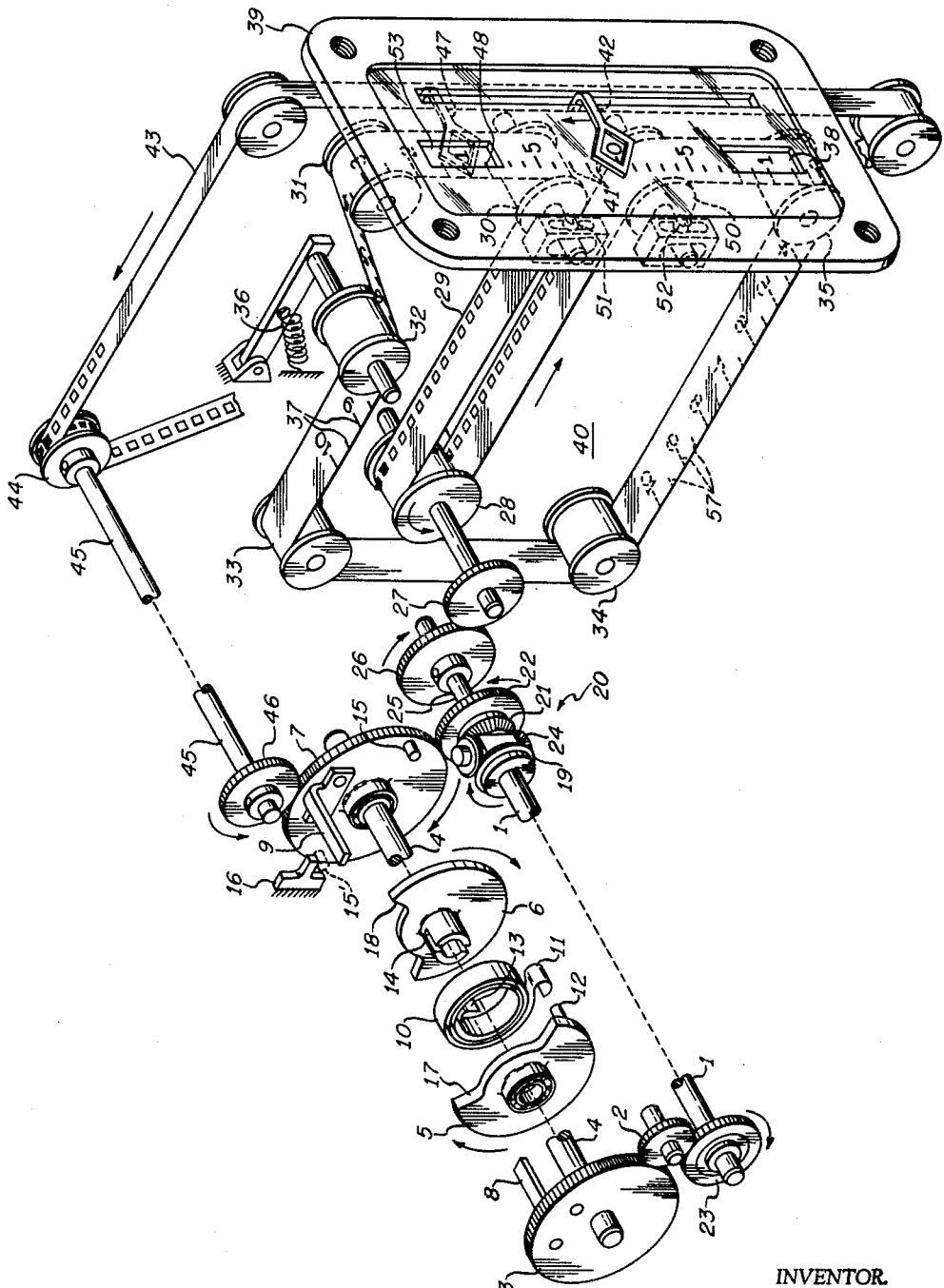
INVENTOR.
RONALD J. GOMES
BY
*Robert J. Haare*
ATTORNEY

United States Patent Office 3,182,631
Patented May 11, 1965

3,182,631
DUAL SCALE SHAFT ANGLE INDICATOR
Ronald J. Gomes, Huntington Station, N.Y., assignor to Sperry Rand Corporation, Great Neck, N.Y., a corporation of Delaware
Filed Nov. 9, 1962, Ser. No. 236,648
10 Claims. (Cl. 116—115)

The present invention generally relates to shaft angle displacement indicators and, more particularly, to an indicator of such type adapted for the display of input shaft displacements in terms of two different scales in accordance with the magnitudes of said displacements.

In certain applications such as, for example, in the display of aircraft vertical velocity data, it is desirable that the scale of the display be changed depending upon the magnitude of the input data. More particularly, it is desirable that aircraft vertical velocity be displayed upon an enlarged scale for relatively small velocities up to a specified amount and that velocities in excess of that amount be displayed upon a reduced scale. The resulting display enables the aircraft pilot to monitor vertical velocity with a higher degree of precision at more critical times such as upon landing or upon assuming a prescribed altitude than at less critical times when the aircraft is executing a power climb or descending maneuver. Relatively large vertical velocities are encountered during the latter situations but the accuracy of data presentation is not of great importance.

Accordingly, an object of the invention is to provide a dual scale indicator for the display of data represented by input shaft angle displacement in terms of a larger or smaller scale, depending upon the magnitude of said data.

Another object is to provide a mechanical means for displaying contiguous ranges of data upon respective indicators.

An additional object is to provide a sequential dual scale data indicator of simple, reliable, and precision mechanical construction.

A further object is to provide mechanical means for drivably coupling an input shaft to one of a pair of output shafts, depending upon the total angular displacement of the input shaft.

These and other objects of the present invention as will appear from a reading of the following specification, are achieved in an illustrative embodiment of an aircraft vertical velocity data indicator by the provision of an analogue storage mechanism, a mechanical differential and gearing means for drivably coupling the storage mechanism to the differential. The analogue storage mechanism comprises an input and an output shaft, and resilient means for coupling the output shaft to the input shaft. In the absence of restraint acting upon the output shaft, the output shaft rotates in synchronism with the input shaft. However, when the output shaft is restrained, the resilient means permits the input shaft to continue to rotate despite the immobility of the output shaft.

The input shaft of the storage mechanism is coupled to a first input of a mechanical differential whereas the output shaft of said mechanism is coupled to the other input of the differential. So long as the output shaft of the storage mechanism is not restrained, the two inputs to the mechanical differential are driven in equal and opposite amounts whereby the spider gear or output of the differential remains stationary. When the output shaft of the storage mechanism is locked, the spider gear of the differential rotates in synchronism with the input shaft of the storage mechanism. Thus, when the storage mechanism output shaft is unrestrained, said output shaft rotates in synchronism with the input shaft and the spider gear is stationary. On the other hand, when the output shaft is locked, then the spider gear rotates in synchronism with the input shaft. An important feature of the invention is that the spider gear begins rotation precisely at the moment when the output shaft ceases rotation and vice versa.

The output shaft of the storage mechanism is drivably coupled by step-up gearing to a movable pointer. The spider gear of the mechanical differential is drivably connected to a continuous tape. The movable pointer is read against an enlarged fixed scale whereas reduced scale markings on the continuous tape are read against a fixed pointer. The ratio between the two scales is determined by the ratio of the reducing gears. In operation, if the input shaft to the analogue storage mechanism is driven in accordance with aircraft vertical velocity, the pointer first moves with respect to its enlarged scale until said velocity increases to a predetermined value. When the predetermined value is reached the pointer ceases to move. Further increase causes translation of the tape. In this manner, relatively low values of vertical velocities are displayed exclusively by the movable pointer whereas relatively higher values of velocity are displayed exclusively by the continuous tape whereby the lower values are separately displayed to a higher degree of precision than are the higher values.

For a more complete understanding of the present invention, reference should be had to the following specification and to the sole figure which is a simplified partially exploded view of an illustrative aircraft vertical velocity embodiment.

Shaft 4 is driven by a source of data such as, for example, an aircraft vertical velocity instrument. In the illustrative case, shaft 4 is driven so that the angular displacement thereof represents aircraft vertical velocity. Gear 3 is fixed to shaft 4 whereas cams 5 and 6 and gear 7 are journaled to rotate about shaft 4. Gears 3 and 7 are equipped with respective arms 8 and 9. Arm 9 is fixed to gear 7 at a radius greater than the radius of which arm 8 is attached to gear 3, relative to the axis of shaft 4. Arms 8 and 9 are of sufficient length so that when the analog storage mechanism components (shown in exploded view for clarity) are assembled, arm 8 may engage cam 6 as well as cam 5 and arm 9 may engage cam 5 as well as cam 6. Cams 5 and 6 are coupled to each other by preloaded helical spring 10. One end 11 of spring 10 engages pin 12 attached to cam 5. The other end 13 of spring 10 is received by slot 14 of cam 6. Gear 7 is equipped with a pin 15 for engaging stop 16.

For the purpose of exemplifying the operation of the apparatus so far described, it is assumed that shaft 4 is driven in the indicated clockwise direction by an input data source (not shown) such as an aircraft vertical velocity instrument. It is to be noted that the preloading of helical spring 10 tends to rotate cams 5 and 6 opposite to each other whereby surfaces 17 and 18 of cams 5 and 6, respectively, are brought to bear upon respective sides of arms 8 and 9 of gears 3 and 7. With the assumed clockwise rotation, arm 8 engages surface 18 of cam 6 to directly drive cam 6 in the indicated clockwise direction. Cam 5 is driven in synchronism with cam 6 through the coupling provided by preload spring 10. Surface 17 of clockwise rotating cam 5 engages arm 9 of gear 7, causing gear 7 to rotate as indicated.

Shaft 4 drives shaft 1 via gears 3, 2 and 23. Shaft 1 drives a first input gear 19 of mechanical differential 20. A second input gear 21 is driven by gear 7 via gear 22. It should be observed that gear 19 is directly driven by shaft 4 through step-up gearing 3, 23 and that gear 21 is driven by shaft 4 through the analogue storage mechanism and step-up gearing 7, 22. The two step-up gear ratios are equal to each other. Thus, input gears 19 and 21 of differential 20 are driven by shaft 4 in precisely equal and opposite amounts so long as gear 7 is free to rotate (pin 15 does not engage stop 16). As will be readily recognized, spider gear 24 of differential 20 rotates by an amount and in direction equal to the difference between the rotations of input gears 19 and 21 and the sense of the difference. Inasmuch as the rotations 19 and 21 are equal and the senses of the rotations are opposite, spider gear 24 remains stationary.

Movable pointer 42 is driven by means of continuous belt 43 which engages sprocket wheel 44 driven by shaft 45. Shaft 45, in turn, is driven by gear 7 via gear 46. Spider gear 24 drives gear 26 via shaft 25. Gear 26, in turn, is drivably coupled by gear 27 to sprocket wheel 28. Wheel 28 engages continuous tape 29 whereby tape 29 moves in accordance with the angular displacement of spider gear 24. Tape 29 also is threaded about rotatable spools 30, 31, 32, 33, 34, 35 and 50 as shown in the figure. Spool 32 is biased by means of spring 36 to make tape 29 sufficiently taut. Tape 29 is provided with scale markings 37 which become visible only through window 53 and similar scale markings 57 which become visible only through window 38 in face plate 39 of the aircraft vertical velocity indicator 40. Scale markings 41 are inscribed on the surface of face plate 39 and serve as fiducial marks against which the position of movable pointer 42 is read. The direction of rotation and displacement of the various gears, shafts and tapes are as indicated in the sole figure in the assumed case of the clockwise rotation of shaft 1.

As shaft 4 continues to rotate in the clockwise direction, so does gear 7. Spider gear 24 remains stationary. Thus, pointer 42 moves in the indicated upward direction relative to face plate 39 to indicate increasing aircraft vertical velocities whereas tape 29 remains stationary. This is the situation up to the point where pin 15 has rotated to position 15' whereby it comes into contact with stop 16.

Scale markings 41 on face plate 39 represent hundreds of feet per minute of aircraft vertical velocity. The scale markings above zero value represent positive (ascending) velocities in the range from zero to +1000 feet per minute. The markings below zero value represent negative (descending) velocities in the range from zero to −1000 feet per minute. The markings 37 and 57 on tape 29 represent aircraft vertical velocity in terms of thousands of feet per minute. It will be observed, that markings 41 comprise an enlarged or fine scale and markings 37 and 57 comprise a reduced or coarse scale. It should also be noted that pointer 42 is driven by shaft 4 in accordance with a gear ratio which is greater than the gear ratio with which tape 29 is driven. The quotient of the gear ratios of the two tape drives is equal to the scale ratio that markings 41 bear with respect to markings 37 and 57.

Continuing the above-described example of the operation of the apparatus, pointer 42 moves upward to reach the topmost position 47 at the same time that pin 15 comes into contact with stop 16. The position 47 of pointer 42 is then read as representing an aircraft vertical velocity of +1,000 feet per minute. This topmost position of pointer 47 actually is read with the aid of markings 48 on tape 29 which have the same scale as the markings 41 on face plate 39.

When pin 15 engages stop 16, cam 5 and tape 43 stop whereas cam 6 continues to turn against spring 10 and tape 29 begins to move in accordance with the rotation of spider gear 24 of differential 20. The movement of tape 29 is such as to cause the scale markings thereon (visible through window 53) to move downward relative to face plate 39. The markings 48 disappear from view and the markings 37 become visible through window 53 as tape 29 continues to move in the downward direction. In this manner, the moving pointer 42 first is read against enlarged scale markings 41 and 48 until a prescribed value (1,000 feet per minute) of aircraft vertical velocity is reached and the pointer has assumed the position 47. Thereafter, as said velocity is exceeded, the position of the then stationary pointer 42 is read against the reduced scale markings 37 representing, in the illustrative case, aircraft vertical velocities in the range from 1000 feet per minute to 10,000 feet per minute. The result is that operator may determine velocities in the range from zero to 1,000 feet per minute with greater accuracy than velocities in the range from 1,000 to 10,000 feet per minute.

Assuming, for example, that the aircraft vertical velocity reaches a peak of, say 3,000 feet per minute and then decreases from said peak toward zero feet per minute (level flight), shaft 4 begins to rotate in a counterclockwise direction and upwinds coiled spring 10. Pin 15 remains in contact with stop 16 in the dotted position 15' while tape 29 now moves in an upward direction relative to face plate 39 and pointer 42 remains stopped at its topmost position. The reversed motion of tape 29 causes decreasing valued scale marking 37 to appear through window 38. This process continues until tape 29 has returned to the position shown in the drawing where the numeral 1 of tape 29 is in registration with pointer 42 (still at its topmost position 47).

As the aircraft vertical velocity decreases downward from +1,000 feet per minute, pointer 42 begins to move downwardly relative to face plate 39 toward the zero position shown in the drawing whereas tape 29 is stopped. This action follows from the fact that cams 5 and 6 had rotated relative to each other in a sense unwinding spring 10 until faces 17 and 18 again engaged arms 8 and 9 of gears 3 and 7 precisely when the aircraft vertical velocity returned to +1,000 feet per minute. Further reduction in vertical speed causes arm 8 to push against surface 17 of cam 5 thereby turning gear 7 in a counterclockwise direction through spring 10, cam 6 and arm 9 to release pin 15 from stop 16. Upon the rotation of gear 7, spider gear of differential 20 stops turning, preventing any further movement of tape 29 whereby it remains accurately indexed at the position shown in the figure while indicator 42 begins to move downwardly toward zero.

An important feature of the invention is that pointer 42 moves only when tape 29 is not moving and vice versa. More importantly, the point at which motion is transferred between the pointer and tape 29 is always accurately calibrated once initial alignment is made between pointer 42 and the markings 48 of tape 29. Such alignment is facilitated by the vertical adjustment of the axes of rollers 30 and 50 by means of respective set screws 51 and 52. It can be seen that the vertical adjustment of roller 30 permits the alignment of the upper numeral 1 on tape 29 relative to window 53 whereas the vertical adjustment of roller 50 permits the alignment of the lower numeral 1 on tape 29 relative to window 38. The central position of the sprocket wheel 28 prevents any adjustment of roller 30 from effecting the calibration of the tape markings visible through the window 38. Likewise, the adjustment of roller 50 does not effect the calibration of tape markings visible through window 53. A further feature of the invention is that the tape is blank in the region between the portions visible through windows 38 and 53 when the tape is in the position shown in the drawing. Thus, as the tape moves downwardly in response to increasing positive vertical velocities in excess of 1,000 feet per minute, the tape markings disappear from view through window 38. Tape markings appear only through window 53 in registration with pointer 42 which then is at its topmost position. Thus, possible misinterpretation of the vertical indicator is precluded. The only time that tape markings are simultaneously visible through windows 53 and 38 is when the indicated vertical velocity is substantially 1,000 feet per minute or less.

Negative vertical velocities (representing descending altitude rates) are displayed by downward motion of pointer 42 for values up to −1000 feet per minute and by an upward motion of tape 29 for negative velocities in excess of −1000 feet per minute in a manner fully equivalent to the one described above in the case of positive aircraft vertical velocities.

It can be seen from the preceding specification that the objects of the present invention have been achieved through the provision of a mechanical transfer device which smoothly and accurately transfers shaft information (represented by the angular displacement of shaft 4) from one output indicator (pointer 42 as read against scale markings 41) to a second output indicator (markings 37 or 57 as read against pointer 42). The transfers take place whenever the shaft information reaches a predetermined value whereby a more precise indication may be produced for information values on one side of said predetermined value and a less precise indication may be produced for values by the other side of said predetermined value. The dual scale shaft angle indicator is further characterized by mechanical simplicity, reliability and compactness.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Means for drivably coupling a first shaft to only one of second and third shafts depending upon the total angular displacement of said first shaft, said means comprising an analogue storage mechanism having an input member resiliently coupled to an output member, said output member rotating in synchronism with said input member when said output member is not restrained, said input member being angularly displaceable whether or not said output member is restrained.

said first shaft being drivably coupled to said input member and said output member being drivably coupled to said second shaft, means for restraining said output member when the angular displacement of said output member corresponds to an angular displacement of said first shaft in excess of a predetermined amount, and a mechanical differential having two inputs and an output, said first shaft being drivably coupled to one input of said differential to drive said one input at a rate in a first sense, and said output member being drivably coupled to the other input of said differential to drive said other input at said rate but in the opposite sense, said output of said differential being drivably coupled to said third shaft.

2. Means for drivably coupling a first shaft to only one of second and third shafts depending upon the total angular displacement of said first shaft, said means comprising an analogue storage mechanism having an input member resiliently coupled to an output member, said output member rotating in synchronism with said input member when said output member is not restrained, said input member being angularly displaceable whether or not said output member is restrained, first speed changing means having a first ratio, said first shaft being drivably coupled to said input member and said output member being drivably coupled to said second shaft by said first speed changing means, means for restraining said output member when the angular displacement of said output member corresponds to an angular displacement of said first shaft in excess of a predetermined amount, second speed changing means having a second ratio different from said first ratio, and a mechanical differential having two inputs and an output, said first shaft being drivably coupled to one input of said differential to drive said one input at a rate in a first sense and said output member being drivably coupled to the other input of said differential, to drive said other input at said rate but in the opposite sense, said output of said differential being drivably coupled to said third shaft by said second speed changing means.

3. Means for drivably coupling a first shaft to only one of second and third shafts depending upon the total angular displacement of said first shaft, said means comprising an analogue storage mechanism having an input member resiliently coupled to an output member, said output member rotating in synchronism with said input member when said output member is not restrained, said input member being angularly displaceable whether or not said output member is restrained.

first gearing means having a first gear ratio, said first shaft being drivably coupled to said input member and said output member being drivably coupled to said second shaft by said first gearing means, means for restraining said output member when the angular displacement of said output member corresponds to an angular displacement of said first shaft in excess of a predetermined amount, second gearing means having a second gear ratio different from said first ratio, and a mechanical differential having two inputs and an output, said first shaft being drivably coupled to one input of said differential to drive said one input at a rate in a first sense, and said output member being drivably coupled to the other input of said differential to drive said other input at said rate but in the opposite sense, said output of said differential being drivably coupled to said third shaft by said second gearing means.

4. Means for displaying first and second contiguous ranges of data comprising first and second data indicators, an analogue storage member having an input member resiliently coupled to an output member, said output member rotating in synchronism with said input member when said output member is not restrained, said input member being angularly displaceable whether or not said output member is restrained, said input member being driven in accordance with the values of said data and said output member being drivably coupled to said first indicator, means for restraining said output member when the angular displacement of said output member corresponds to the maximum value of said first range of data, and a mechanical differential having two inputs and an output, said input member being drivably coupled to one input of said differential to drive said one input at a rate in a first sense, and said output member being drivably coupled to the other input of said differential to drive said other input at said rate but in the opposite sense, said output of said differential being drivably coupled to said second indicator.

5. Means for displaying first and second contiguous ranges of data, said data being represented by the angular displacement of an input shaft, said means comprising first and second data indicators, an analogue storage mechanism having an input member resiliently coupled to an output member, said output member rotating in synchronism with said input member when said output member is not restrained, said input member being angularly displaceable whether or not said output member is restrained, said shaft being drivably coupled to said input member, and said output member being drivably coupled to said first indicator, means for restraining said output member when the angular displacement of said output member corresponds to the angular displacement of said input shaft representing the maximum value of said first range of data, and a mechanical differential having two inputs and an output, said input shaft being drivably coupled to one input of said differential to drive said one input at a rate in a first sense, and said output member being drivably coupled to the other input of said differential to drive said other input at said rate but in the opposite sense, said output of said differential being drivably coupled to said second indicator.

6. Means for displaying first and second contiguous ranges of data, said data being represented by the angular displacement of an input shaft, said means comprising first and second data indicators, an analogue storage mechanism having an input member resiliently coupled to an output member, said output member rotating in synchronism with said input member when said output member is not restrained, said input member being angularly displaceable whether or not said output member is restrained, first speed changing means having a first ratio, said input shaft being drivably coupled to said input member and said output member being drivably coupled to said first indicator by said first speed changing means, means for restraining said output member when the angular displacement of said output member corresponds to the angular displacement of said input shaft representing the maximum value of said first range of data, second speed changing means having a second ratio different from said first ratio, and a mechanical differential having two inputs and an output, said input shaft being drivably coupled to one input of said differential to drive said one input at a rate in a first sense, and said output member being drivably coupled to the other input of said differential to drive said other input at said rate but in the opposite sense, said output of said differential being drivably coupled to said second indicator by said second speed changing means.

7. Means for displaying first and second contiguous ranges of data, said data being represented by the angular displacement of an input shaft, said means comprising first and second data indicators, an analogue storage mechanism having an input member resiliently coupled to an output member, said output member rotating in synchronism with said input member when said output member is not restrained, said input member being angularly displaceable whether or not said output member is restrained, first gearing means having a first gear ratio, said input shaft being drivably coupled to said input member and said output member being drivably coupled to said first indicator by said first gearing means, means for restraining said output member when the angular displacement of said output member corresponds to the angular displacement of said input shaft representing the maximum value of said first range of data, second gearing means having a second gear ratio different from said first gear ratio, and a mechanical differential having two inputs and an output, said input shaft being drivably coupled to one input of said differential to drive said one input at a rate in a first sense, and said output member being drivably coupled to the other input of said differential to drive said other input at said rate but in the opposite sense, said output of said differential being drivably coupled to said second indicator by said second gearing means.

8. Means for displaying first and second contiguous ranges of data, said data being represented by the angular displacement of an input shaft, said means comprising a first indicator arranged for the display of data according to a first scale ratio, a second indicator arranged for the display of data according to a second scale ratio, an analogue storage mechanism having an input member resiliently coupled to an output member, said output member rotating in synchronism with said input member when said output member is not restrained, said input member being angularly displaceable whether or not said output member is restrained, first speed changing means having said first ratio, said input shaft being drivably coupled to said input member and said output member being drivably coupled to said first indicator by said first speed changing means, means for restraining said output member when the angular displacement of said output member corresponds to the angular displacement of said input shaft representing the maximum value of said first range of data, second speed changing means having said second ratio, and a mechanical differential having two inputs and an output, said input shaft being drivably coupled to one input of said differential to drive said one input at a rate in a first sense, and said output member being drivably coupled to the other input of said differential to drive said other input at said rate but in the opposite sense, said output of said differential being drivably coupled to said second indicator by said second speed changing means.

9. Means for displaying first and second continguous ranges of data, said data being represented by the angular displacement of an input shaft, said means comprising an indicator having an apertured face plate inscribed with first fiducial marks having a first scale ratio, a movable pointer mounted in cooperative relationship with said first fiducial marks, a movable member inscribed with second fiducial marks having a second scale ratio, said movable member being mounted in cooperative relationship with said face plate so that said second fiducial marks are visible through the aperture in said face plate, an analogue storage mechanism having an input member resiliently coupled to an output member, said output member rotating in synchronism with said input member when said output member is not restrained, said input member being angularly displaceable whether or not said output member is restrained, first speed changing means having said first ratio, said input shaft being drivably coupled to said input member and said output member being drivably coupled to said movable pointer through said first speed changing means, means for restraining said output member when the angular displacement of said output member corresponds to the angular displacement of said input shaft representing the maximum value of said first range of data, second speed changing means having said second ratio, and a mechanical differential having two inputs and an output, said input shaft being drivably coupled to one input of said differential to drive said one input at a rate in a first sense, and said output member being drivably coupled to the other input of said differential to drive said other input at said rate but in the opposite sense, said output of said differential being drivably coupled to said movable member by said second speed changing means.

10. Means for displaying first and second contiguous ranges of data, said data being represented by the angular displacement of an input shaft, said means comprising an indicator having an apertured face plate inscribed with first fiducial marks having a first scale ratio, a movable pointer mounted in cooperative relationship with said first fiducial marks, a movable member inscribed with second fiducial marks having a second scale ratio, said movable member being mounted in cooperative relationship with said face plate so that said second fiducial marks are visible through the aperture in said face plate, an analogue storage mechanism having an input member resiliently coupled to an output member, said output member rotating in synchronism with said input member when said output member is not restrained, said input member being angularly displaceable whether or not said output member is restrained, first gearing means having said first gear ratio, said input shaft being drivably coupled to said input member and said output member being drivably coupled to said movable pointer through said first gearing means.

means for restraining said output member when the angular displacement of said output member corresponds to the angular displacement of said input shaft representing the maximum value of said first range of data, second gearing means having said second gear ratio, and a mechanical differential having two inputs and an output, said input shaft being drivably coupled to one input of said differential to drive said one input at a rate in a first sense, and said output member being drivably coupled to the other input of said differential to drive said other input at said rate but in the opposite sense, said output of said differential being drivably coupled to said movable member by said second gearing means.

References Cited by the Examiner
UNITED STATES PATENTS

| | | | |
|---|---|---|---|
| 2,746,318 | 5/56 | Benjamin | 235—91 |
| 2,830,762 | 4/58 | Christensen | 235—91 |
| 2,941,400 | 6/60 | Nesbitt | 73—178 |
| 3,027,768 | 4/62 | Melchior | 116—135 |
| 3,028,083 | 4/62 | Beer | 235—91 |

LOUIS J. CAPOZI, *Primary Examiner.*